United States Patent [19]

Anderson

[11] Patent Number: 4,509,151
[45] Date of Patent: Apr. 2, 1985

[54] MARINE ACOUSTIC ANALYSIS SYSTEM AND METHOD

[75] Inventor: George B. Anderson, Dallas, Tex.

[73] Assignee: Sea World, Inc., San Diego, Calif.

[21] Appl. No.: 342,494

[22] Filed: Jan. 22, 1982

[51] Int. Cl.$^3$ ................................................ G01S 3/80
[52] U.S. Cl. ..................................... 367/118; 367/120; 367/122; 367/130; 367/131
[58] Field of Search ..................................... 367/15–20, 367/130, 131, 135, 191, 105, 122, 124, 118, 120

[56] References Cited

U.S. PATENT DOCUMENTS

| | | | |
|---|---|---|---|
| 1,383,690 | 7/1921 | Arnold | 367/130 X |
| 3,189,870 | 6/1965 | Roever | 367/20 |
| 3,434,104 | 3/1969 | Stapleton et al. | 367/154 |
| 3,613,071 | 10/1971 | Quay | 367/20 |
| 4,084,150 | 4/1978 | Massa | 367/155 |
| 4,122,432 | 10/1978 | Triebold et al. | 367/135 |

OTHER PUBLICATIONS

Knudsen et al., *J. Marine Research*, vol. 7, No. 3, 1948, pp. 410–429.

Primary Examiner—Richard A. Farley
Attorney, Agent, or Firm—Kenyon & Kenyon

[57] ABSTRACT

An apparatus for locating, classifying and identifying underwater marine animals by means of the sounds they make includes an elongated submersible array adapted to be towed in various directions. The array is made up of subarrays of multiple hydrophones which are arranged along the length of each subarray in groups. By changing the combinations of groups, the frequency response and the directional sensitivity of the array can be varied. The outputs of the groups can be selectively analyzed both visually and audibly for characteristic fish sounds. The received sounds are classified and used for the identification of newly found fish.

38 Claims, 11 Drawing Figures

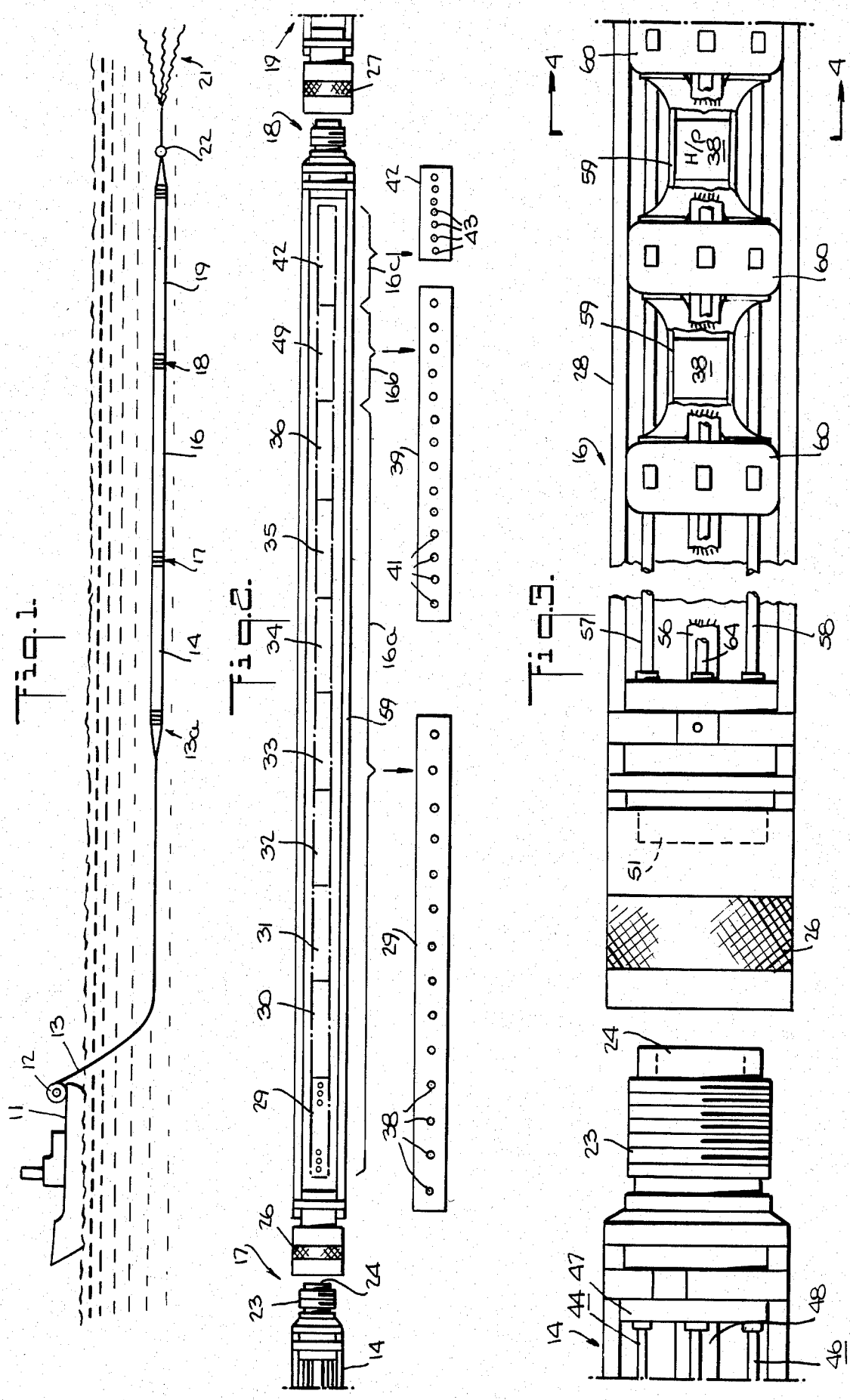

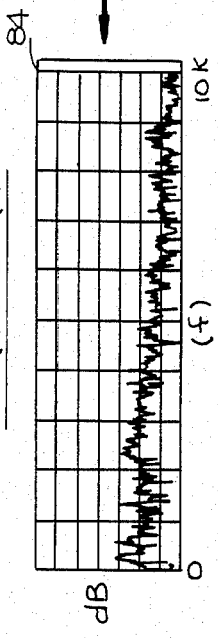
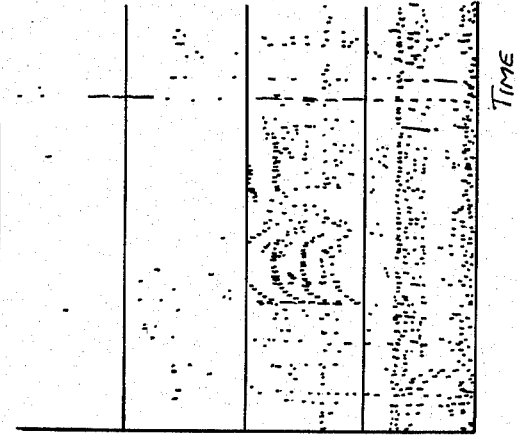
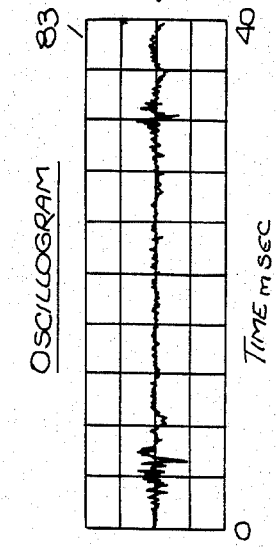
Fig. 7.

HUMPBACK WHALE

TUNA

MARINE ACOUSTIC ANALYSIS SYSTEM AND METHOD

BACKGROUND OF THE INVENTION

1. Field of the Invention

This invention relates to the field of analysis and classification of marine animal sounds sensed by an array of hydrophones towed behind a ship and displayed electronically in conjunction with catalogued characteristics of sounds. The sounds can be predetermined or catalogued and used, as known sounds, to identify newly detected sounds. In particular, the invention enables the specific sounds of various species of marine animals to be detected and classified as to type and location.

2. Prior Art

Linear hydrophone arrays which are towed by ships to detect various type of marine sounds have been extensively used in the past. Such arrays have been used for offshore oil exploration to pick up and analyze sounds produced by the detonation of explosives or the use of other sound sources such as compressed air guns under water in order to explore the possibility that the sea bed contains sources of oil. Hydrophone arrays have also been used by naval antisubmarine forces to detect the sounds of submerged submarines. In addition, such arrays have been used by various oceanographic research groups to conduct studies of underwater sound propagation.

An early form of sound detector is described in U.S. Pat. No. 1,584,613 by Comstock et al, issued on May 11, 1926. In their device, microphones are spaced along a cable to be towed behind a ship. The spacing between adjacent microphones was proposed to be one-half the wavelength of the sound to be detected which would result in there being relatively few microphones or an extremely long cable in order to detect low frequency sounds. The signals are combined cumulatively. The array is most sensitive to sounds arriving in a broadside direction and least sensitive to sounds arriving from fore and aft directions. It is also proposed that the selectivity can be increased by incorporating tuned or resonating circuits between the microphones and indicating devices.

U.S. Pat. No. 3,239,803 of Godbey which issued on Mar. 8, 1966 describes another form of detection apparatus using a plurality of sound transducers spaced along a cable and connected together. Electrical signals from the transducers are amplified and passed through discriminating circuits arranged to identify the signals from each individual transducer. The output signals of the discriminators are recorded in a conventional manner.

U.S. Pat. No. 3,893,063 of Park et al. which issued on July 1, 1975, discloses a torpedo detection streamer comprising a plurality of microphone units which are maintained in a predetermined position to obtain a vertically oriented response pattern.

An elastic detection streamer device is described in U.S. Pat. No. 3,319,734 of Pavey which issued on May 16, 1967. In that device, the vibrations from the cable used to tow the sound detecting apparatus are absorbed by an elongated flexible mechanical vibration attenuator interposed between the forward end of the detection streamer and the trailing end of the towing cable. The vibration attenuator is in the form of an oil-filled flexible elastic tube generally similar to the detection streamer tubing and provided with conductors for carrying signals from the detection streamer to leads within the towing cable. A plurality of strain cables of a suitable elastic material, such as nylon, extend through the vibration attenuator to provide an elastic towing connection between the tow cable and the detection streamer. Both the vibration attenuator and the detection streamer contain oil to provide proper buoyancy at a predetermined submerged level. A line is connected to the aft end of the streamer and secured to a float or marker to make it possible to keep track of the location of the submerged streamer.

OBJECTS AND SUMMARY OF THE INVENTION

It is one of the objects of the present invention to provide an apparatus and a method for locating and identifying marine animals by means of their sounds to provide efficient guidance for commercial fishing operations.

It is another object of the invention to provide a linear hydrophone array for detecting sounds of bottom dwelling and schooling fish, and concentrations of crustaceous and marine animals.

It is a further object of the invention to provide a passive sonar system to detect the specific sounds produced by surface and mid-water fish such as turn, and bottom fish such as white sea bass, as well as specific sounds produced by several species of crustacea and by various species of cetacea.

It is still another object of the invention to enable the recording of the characteristic sounds of known underwater sound sources in terms of their characteristic power spectra, frequencies, bandwidths, amplitudes and other observable phenomena such as sound source direction, for comparison with, and thereby the eventual identification of, unknown underwater sound sources.

Further objects will become apparent from the following specification together with the drawings.

In accordance with the present invention, there is provided a towed passive acoustic array containing a plurality of groups of hydrophones. The plurality of groups are enclosed in an elongated buoyant housing which is adapted to be towed by a vibration isolation module of similar buoyancy. The vibration isolation module, which is connected by a tow cable to a towing ship, reduces the transmission of noises from the towing ship and the tow cable itself to the acoustic array. A vibration isolation module is also provided at the after end of the acoustic array in order to enable a drogue to be employed to apply tension to the array to connection to the aft isolation module. In this way, noises from the drogue are prevented from being transmitted to the array.

The acoustic array, itself, includes a watertight elongated housing which, for example, contains three subarrays of hydrophones. The first subarray is arranged in a set of elongated sections, each of which includes a group of hydrophones spaced longitudinally along it. The hydrophones in each group are connected in parallel and all of the groups are connected through cables in the forward vibration isolation module and the tow cable to electronic apparatus on the ship. The length of the first subarray of hydrophones is approximately equal to at least one wavelength which is centered in the lowest frequency band for which the apparatus is intended to be used.

The second subarray of hydrophones also includes a plurality of groups of hydrophones longitudinally spaced along it with the hydrophones in each group connected electrically in parallel to another cable that passes through the forward vibration isolation module and the towing cable to the ship. The second subarray also has a length substantially equal to at least one wavelength of an intermediate frequency to which it is intended to be most sensitive. The intermediate frequency is selected to be in a higher frequency band than the band to which the first subarray of groups of hydrophones is intended to be sensitive.

At the after end of the elongated acoustic array is a third subarray of groups of hydrophones also equally spaced apart over a distance substantially equal to at least one wavelength in the highest frequency band to which the array is intended to be sensitive. As in the case of the other subarrays, the hydrophones in the groups of the third subarray are also connected in parallel and are connected to the electronic apparatus on the ship by another cable that passes through the forward vibration isolation module and the towing cable.

Each of the groups of hydrophones are provided with a separate channel for transmitting the output sound signal of the group. Accordingly the signal of each channel representing a different group of hydrophones is available to be analyzed for frequency and to be classified. By selecting predetermined combinations of groups of hydrophones and subarrays, the effective length of each subarray and of the array can be varied. Since the beam width of the response of predetermined combinations of groups of the array is a direct function of the length of the combination of groups for a given sound frequency, information regarding the direction of the source of a detected sound with respect to the array can be measured, analyzed, and classified. By the use of previously classified information as to individual species, speedy identification of newly encountered fish, crustacea, or cetacea can be made.

BRIEF DESCRIPTION OF THE DRAWINGS

FIG. 1 is a simplified drawing depicting an acoustic array connected between fore and aft vibration isolation modules and towed behind a ship.

FIG. 2 is an enlarged view of the acoustic array of FIG. 1 showing the arrangement of hydrophones therein.

FIG. 3 is a horizontal cross-section of a typical connection between the acoustic array in FIG. 2 and one of the isolation modules.

FIG. 7 shows apparatus and wave forms derived therefrom for analyzing acoustic signals representative of a porpoise.

DETAILED DESCRIPTION OF THE INVENTION

Figure 4:
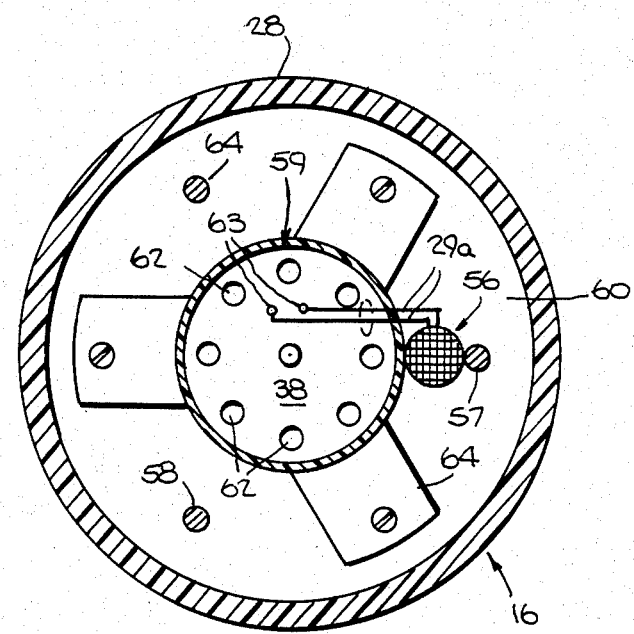
FIG. 4 is a vertical cross-section taken along the line 4—4 in FIG. 3 and showing placement of a hydrophone in an array.

FIG. 1 shows a simplified representation of marine apparatus for conducting pickup and analysis of underwater sounds, particularly as an aid to commercial fishing operations. For example, in fishing for tuna, it is desirable to locate schools of tuna, but this requires that sounds produced by schools of tuna be distinguished from sounds produced by other types of marine animals, such as porpoise, and from sounds produced by ships and other mechanical sources of noise. Since, for example, tuna sometimes aggregate under porpoise and it is desired to avoid including porpoise in the tuna catch, it is very useful in saving of time and effort necessary to set a purse seine to use the apparatus of FIG. 1 to determine whether or not a particular school of tuna is under porpoise.

The apparatus shown in FIG. 1 includes a towing vessel 11 with a winch 12 on its stern. A tow cable 13, which is originally wound on the winch, is shown unwound to the extent of at least approximately 300 feet and preferably 600 feet or even more between the winch 12 and the towing end electrical and strength connector 13a at the forward end of a vibration isolation module 14. By way of example, the tow cable can comprise a faired cable having a stress member which is 0.25 inch diameter, torque-balanced, control cable of approximately 7000 pounds breaking strength. In addition, the faired cable includes a plurality of pairs of electrical conductors, such as thirty-two pairs. The electrical conductors are encased within an electrical shielding construction such as a woven sleeve of copper wire. The covering of the tow cable can be of polyurethane material. In the example described herein, the tow cable has an outside diameter of approximately 1.24 inches.

Acoustic array 16 is a passive sonar device which is used to pick up underwater sounds. A passive sonar system is one adapted to detect sounds generated by the target for display as a function of sound amplitude and frequency as well as direction to the target itself.

The purpose of the vibration isolation module is to absorb or attenuate vibrations, including sound vibrations of the ship and the tow cable, which would otherwise be transmitted by the tow cable 13 to the acoustic array 16. In order to prevent vibrations from the ship 11 from reaching the acoustic array 16, the vibration isolation module 14 is constructed to have a degree of longitudinal elasticity sufficient to absorb longitudinal vibrations. By way of example, it has been found satisfactory to construct the vibration isolation module 14 as a hollow tube 15 of a suitable resin material such as polyvinyl chloride (PVC) material approximately 1.875 inches (FIGS. 3). The inner diameter is large enough to accommodate thirty-two or more pairs of signal-conducting wires adapted to be connected to the acoustic array 16. These wires are not stretched taut within the module 14 but, instead, are installed with sufficient looseness to enable the module to stretch in response to longitudinal stress applied thereto. In addition to the resin outer casing, the vibration isolation module 14 includes stress members in the form of nylon rope. By way of example, three 0.25 inch nylon ropes may be used. The overall elasticity of the module due to the stretching capabilities of the nylon ropes and the elasticity of the resin tubes can result in elongation of about 15-20% with a longitudinal tension of 540 pounds for the example given above.

It is normally desired to cause both the vibration isolation modules 14 and 19 and the acoustic array 16 to be positioned at a predetermined depth below the surface of the water when being towed. The weight of the tow cable 13 and tow cable connection 13a is used, along with variation of the ship's speed, to depress the array to the desired depth. In order to give the vibration isolation module the proper buoyancy, it has been found satisfactory to fill the tube of PVC material with a suitable quantity of fluid having a low enough specific gravity to compensate for the weight of the module 14 and a portion of the weight of the tow cable. A liquid suitable for this purpose is a kerosene material, such as Shell Sol #71 or its equivalent, which not only provides the proper overall buoyancy due to its specific gravity of 0.753 but is also compatible with the insulation of the electrical conductors.

By way of example, the buoyancy of the module 14 and of the array 16 can be adjusted to give the following operating conditions:

| | Length of Tow Cable 13 | | | |
|---|---|---|---|---|
| | 300 Feet | | 400 Feet | |
| Speed KNOTS | Tow Angle From Vertical | Tow Depth FEET | Tow Angle From Vertical | Tow Depth FEET |
| 3 | 61° | 145 | 65° | 169 |
| 4 | 72° | 93 | 68-72° | 149-123 |
| 5 | 75° | 78 | 75° | 103 |

The vibration isolation module 14 is connected to the acoustic array 16 by a suitable watertight coupling 17, and a similar watertight coupling 18 connects the trailing end of the acoustic array 16 to a second vibration isolation module 19. At the after end of module 19 there is attached a rope drogue 21 consisting of rope connected by means of a rotable or swivel coupling 22 to the module 19. By way of example, drogue 21 may comprise nylon rope such as one hundred feet of 0.5 inch rope. The purpose of the rope drogue is to put sufficient tension on the entire assembly consisting of the two vibration isolation modules 14 and 19 and the acoustic array 16 to allow smooth movement thereof through the water. The rope drogue 21 is free to move in accordance with the drag produced by the water. Vibration isolation module 19 isolates the acoustic array 16 from vibrations of the rope drogue. The after vibration isolation module 19 can be constructed in the same way as the forward module 14, but it need not contain any electrical conductors; however, if module 19 includes the conductors, it provides the vessel 11 with a spare module in case there is some electrical breakdown in the module 14.

The acoustic array 16 is shown in greater detail in FIG. 2. Also shown in this figure is the extreme after end of the forward vibration isolation module 14, including an externally threaded sleeve 23 and a multiconnector plug 24. The sleeve 23 threads into an internally threaded rotable ring 26 on the forward end of the acoustic array 16, and a similar externally threaded sleeve 18 at the other end of the array provides means for connection to the after vibration isolation module 19.

By way of example, the main part of the acoustic array can consist of a hollow tube 28 of polyvinyl chloride (PVC) material approximately 200 feet long and having an outside diameter of 1.875 inches. The acoustic pickup apparatus is divided into three portions of 16a, 16b, and 16c (FIG. 2). The first subarray 16a can include eight groups 29-36, each of which contains a plurality of hydrophones 38 spaced along its length. One of these groups, such as the group 29, is shown enlarged in FIG. 2 to illustrate the fact that the hydrophones 38 are evenly spaced apart by a distance which is selected to be a function of the frequency of sounds to be analyzed.

As an example, in the case of acoustic arrays for use in tuna fishing, it is desirable that each of the groups 29-36 be approximately twenty-one feet long and include fourteen hydrophones 38 spaced approximately eighteen inches apart, center-to-center. Thus, in the first subarray 16a of the acoustic array 16, there are one hundred and twelve hydrophones. The overall length of the first subarray is approximately one hundred and sixty-eight feet, which is approximately the length of one wavelength of sound having a frequency of thirty Hz, noting that the velocity of sound in water is approximately five thousand forty feet per second. It may not necessarily be desired to have as many as one hundred and twelve hydrophones, but it is desirable to have a relatively large number in order to make the array sufficiently sensitive to sounds produced by marine animals. Thus a useful level of sound signal must be obtained from the array 16 if the marine animal or fish emitting sound is to form a target for the fishing vessel to seek and determine. It is of advantage to have at least ten hydrophones per wavelength. Furthermore, it is of advantage to connect the hydrophones in parallel to maximize the electrical signals produced by these transducers in response to acoustic input signals. Another advantage resulting from dividing the first subarray into a number of groups 29-36 is to compensate for the possibility that one or more of the groups may become inoperative while in use.

In locating tuna, it has been found that another important band of frequencies is centered at approximately four hundred and eighty Hz. By way of example, subarray 16b comprising a second group 39 of the acoustic array is arranged to be sensitive to sounds in a band of frequencies centered at about four hundred and eighty Hz. For that purpose, the second group 39 includes one section consisting of fourteen hydrophones 41 spaced approximately nine inches apart. Thus, the total length of the second subarray is approximately ten and one half feet which is approximately the length of one wavelength of sound at a frequency of about four hundred and eighty Hz in water. As in the case of the low frequency groups, the second group 39 need not have as many as fourteen hydrophones in order to be operative; however it is desirable that the spacing between the hydrophones 41 be less than one-tenth of the wavelength that the second portion 39 is intended to pick up.

It will be noted that the overall length of the second group 39 which is approximately ten and one half feet is substantially less than one-tenth the length of the first portion, which is approximately one hundred and sixty-eight feet. This corresponds to the fact that the frequency of four hundred and eighty Hz to which the second group 39 is sensitive is more than ten times as high as the frequency of thirty Hz to which the first portion is sensitive. The distance between the hydrophones 41 in group 39 is nine inches, which is half the distance between the hydrophones 38 in each of the first group of the first subarray 16a and is less than one-tenth the acoustic wavelength of a four hundred and eighty Hz sound wave.

Further by way of example, the acoustic array 16 includes a third subarray 16c which comprises group 42. Group 42 is sensitive to sounds in a higher frequency band, i.e., around thirty-eight hundred and forty Hz. The group 42 is only one and three tenths feet long, which is about one-eighth the length of the second portion 39, but is also about equal to one wavelength of a thirty-eight hundred and forty Hz signal in water. The third group includes seven hydrophones 43, half as many as the second portion 39, and they are spaced only two inches apart, center-to-center. The third group 42 is disposed at the after end of the acoustic array 16 in order that it be separated from the vessel 11 as much as possible. This arrangement minimizes the reception of any relatively high frequency sounds emanating from the vessel.

The spacing of hydrophone groups may differ for groups of fin fish other than tuna as well as for crustaceans. Data on the acoustic signatures of several hundred marine organisms are available in the literature. These data were used in selecting the center frequencies of the three sub-arrays in the illustrative example above. Thus, the low frequency embodiment of the sound structure was chosen to be sensitive to tailbeat frequencies. The mid-frequency component was chosen to be sensitive to pulsed fish feeding noise and can be chosen to be sensitive to the sounds of croakers, groupers, etc., e.g., sensitive to active acoustic fish as well as to pulsed fish feeding noise. The high frequency is chosen to be sensitive to the pulsed signals of most crustaceans, fish feeding noise, and cetacean sounds; in this case to such sounds from porpoise.

FIG. 3 is a longitudinal cross-sectional view of a portion of the forward vibration isolation module 14 and of the acoustic array 16, taken in a horizontal plane. Included in the module 14 are several nylon stress members or ropes which transmit a towing force to the acoustic array 16, the aft vibration isolation module 19, and the rope drogue 21. Only two of these nylon stress members 44 and 46 are visible in FIG. 3. The stress members are threaded through cross-members 47 to hold them properly in position within the module 14. Also shown in the module 14 is a multiconductor cable 48 having a plurality of pairs of signal conductors. By way of example, when the array comprises ten groups as described above, the cable 48 may include thirty-two pairs of conductors in the embodiment being disclosed.

The threaded sleeve 23 is attached to the end of the module 14 and includes an internal transverse flange (not shown) on which the plug 24 is supported. This plug is inserted into a socket 51 at the forward end of the acoustic array 16. The socket 51 is mounted in a flange (not shown) inside of the internally-threaded ring 26 which engages the sleeve 23 in order to form a water-tight coupling between the module 14 and the acoustic array 16.

Only a portion of hydrophone group 29 of the first subarray 16a of the acoustic array 16 is shown in FIG. 3. This portion includes a plastic mounting sleeve 59 for the first hydrophone 38. Another multiconductor signal cable 56 extends from the socket 51 through the spacers 60, bypassing the plastic mounting sleeves 59 which support coupling transformer 65 shown in FIG. 5 as 65a, 65h . . . ) and hydrophone 38. Conductors 29a (FIG. 4) from cable 56 connect the hydrophone within sleeve 59 to coupling transformer 65. Other conductors of cable 56 extend further aft and connect the other hydrophones of group 29 to the input of coupling transformer 65. Also extending through the housing 28 are several steel cable stress members 64 57 and 58. Unlike the module 14, it is not desirable for the acoustic array module 16 to stretch and contract when in use. The steel cable stress members 64 57 and 58 prevent such stretching while still allowing lateral flexibility in the array to enable it to deflect along its length in the course of its operation and to be wound upon a drum when not in use.

In the present embodiment, the module 16 is approximately 200 feet in length and each of the steel cable stress members (total of three in number) comprises 0.094 inch outside diameter wire rope in a $1 \times 19$ ply and strand arrangement of galvanized plow steel and having a breaking strength of 3,600 pounds. The housing 28 may be tubular PVC resin material which forms a sealed enclosure. As is the case of the isolator 14, the module 16 can be filled with a low specific gravity liquid such as Shell Sol #71 or its equivalent to establish a predetermined condition of buoyancy.

FIG. 4, which is a vertical cross-sectional view of the acoustic array 16, illustrates the transverse arrangement of a typical hydrophone 38. This hydrophone 38 is located on the longitudinal axis of the module and held in place by a soft plastic sleeve 59 which in turn is connected by screws to the module spacers 60. The hydrophone elements are exposed to the array ambient pressure through free flooding holes 62 in the hydrophone case. Conductor wires 29a are connected to the hydrophone at hydrophone terminals 63. This vertical cross-sectional view also shows the arrangement of the three steel stress members 57, 58, and 64. The bundle of conductor wires 56 pass around each hydrophone 38 and through a hole in each spacer face. Each hydrophone group 29, 30, 31, 32, 33, 34, 35, 36, 39, 42 is connected either to a pre-amplifier or, as in this case, to a coupling transformer 65 mounted axially in the array in a manner similar to that of the individual hydrophones.

The filling liquid for acoustic array 16, which can be Shell Sol #71, a kerosene-based fill liquid having a specific gravity of about 0.753, enables isolation module 14, array 16, and isolation module 19 to be trimmed to a condition of substantially neutral buoyancy for a predetermined tow depth, for example, of approximately one hundred feet. Adjustments in buoyancy can be accomplished by varying the amount of fill fluid in the modules via fill ports (not shown).

Figure 5:
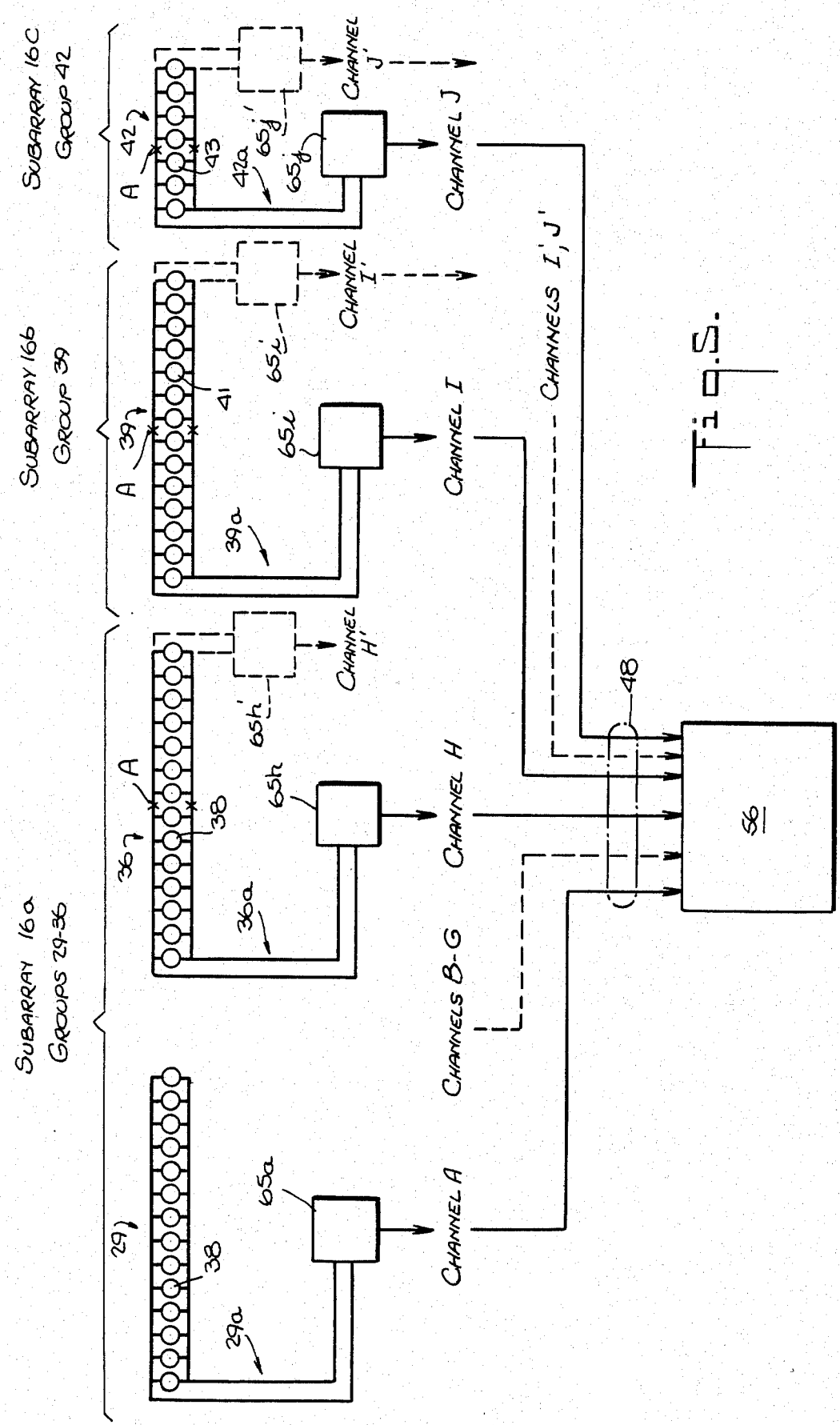
FIG. 5 is a schematic representation of the connection of hydrophones with groups of the subarrays to a cable system leading to analytical circuits.

Hydrophones 38 may be low-frequency Teledyne Model T-1 hydrophones. Hydrophones 41 may be middle-frequency Teledyne T-1 hydrophones, while hydrophones 43 may be high-frequency Aquadyne AQ-1 hydrophones. As shown in FIG. 5, the hydrophones 38 in each of the groups 29–36 are connected in parallel by twisted pairs of conductors 29a to 36a, respectively, of cable 56. Similarly, conductors 39a are connected to hydrophones 41 of group 39 and conductors 42a are connected to hydrophones 43 of group 42. The conductor pairs from each of the ten groups of hydrophones are fed through their own group transformer (like transformer 65 of FIG. 4) and then out of the array as ten channels A-J. This arrangement of the connections of the groups of hydrophones enable the hydrophone groups of array 16 to be read individually, as a plurality of groups in subarray 16a, as a combination of a group from subarray 16a with subarray 16b or 16c, or as a combination of subarrays. By connecting various combinations or fractions of groups of hydrophones as listed below, the horizontal beam width of the array can be predetermined as a function of the various center frequencies of the subarrays 16a-16c. Accordingly, by selecting the proper combination of groups for a given frequency of sound being received, the beam width can be varied from a broad beam width to a narrow beam width. Once the sound of a given target at a given frequency is obtained, the combination of groups can be varied in order to vary the beam width from a broad beam width to a narrow or discrete beam width. A narrow beam width enables more precise determination of the direction of a target with respect to the array. This is particularly true when swinging the towing ship to change the bearing of the array and thereby maximize the amplitude of the receiving sound.

| Beam Width (Degrees) | BROADSIDE BEAM WIDTH COMBINATIONS ||||||| |
|---|---|---|---|---|---|---|---|---|
| | LF SUBARRAY 16a |||| MF SUBARRAY 16b ||| HF SUBARRAY |
| | 30 Hz | 60 Hz | 120 Hz | 240 Hz | 480 Hz | 960 Hz | 1920 Hz | 3840 Hz |
| 50 | 8 | 4 | 2 | 1 | 1 | ½ | | 1 |
| 28 | | 8 | 4 | 2 | 1 | 1 | ½ | |
| 20 | | | 8 | 4 | 2 | 1 | 1 | ½ |
| 16 | | | | 8 | 4 | 2 | 1 | ½ |
| 7 | | | | | 8 | 4 | 2 | 1 |

From the table above, it can be seen that the selection of eight groups by channels A-H, results in a beam width of 16° at a sound frequency of 240 Hz. Selecting four adjacent groups of channels A-H results in a beam width of 20° for sounds of 240 Hz. The maximum beam width of 50° for sounds of 240 Hz is obtained by use of a single one of channels A-H. The directional effect of each of the various combinations can be enhanced by means of filters connected between the array and the receiver to narrow the band of frequencies being detected. Thus, by limiting the frequencies of sound being detected to the natural frequency of the array, full advantage can be taken of the directional pattern available at that frequency.

As is shown in FIG. 5, one of the groups 29-36, in this case, group 36, and each of the groups 39 and 42 can be divided into subgroups at a midpoint A, and each subgroup can be coupled, via its own coupling transformer 65h′, 65i′, and 65j′, to additional channels H′, I′ and J′. In this way, additional beam widths, as indicated by the fraction ½ in the table above can be obtained.

Figure 10A:
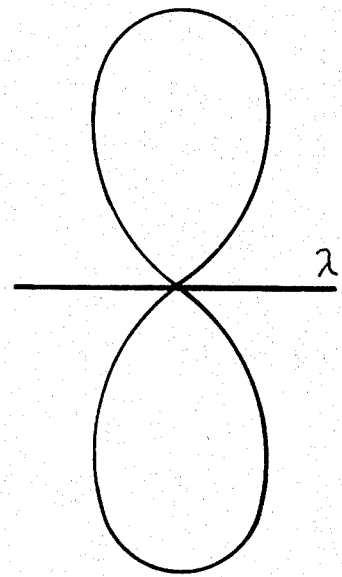
FIGS. 10a and 10b are charts in polar form showing the beam width of the same subarray combination when operating at a wavelength which is equal to the length of the subarray, and at a wavelength which is half the length of the subarray, respectively.
Figure 10B:
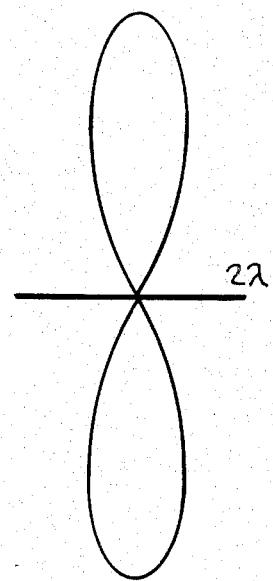

FIGS. 10a and 10b illustrate two polar sensitivity patterns to show how the beam width of an array of given length varies as a function of frequency. FIG. 10a shows a polar plot of the broadside beam of an array portion having a length of one wavelength and FIG. 10b is the polar plot of the broadside beam of an array portion leaving a length of two wavelengths. These figures illustrate, for example, the beam widths of 50° and 28° obtainable at 30 Hz and 60 Hz, respectively, when using all eight groups of hydrophones in subarray 16a, or at 480 Hz and 960 Hz, when using all the hydrophones in subarray 16b.

As shown by the table above, the acoustic array 16 of hydrophone groups can be operated as a function of the target signals desired. An array designed for one specific target will most likely hear other targets in the same frequency band such that any one array system will undoubtedly be effective against several species of marine animals or fish.

As an example, an array of the embodiment disclosed herein is sensitive to various species as set forth below:
Low-frequency subarray 16a=the hydroacoustic sounds of swimming schooling fish.
Mid-frequency subarray 16b=the gill sounds and jaw popping sounds of fish, shrimp, lobsters and crabs.
High-frequency subarray 16c=the phonations of shrimp, crustacea, some species fish and cetaceans.

Array 16 will also detect bottom shrimp, distant shipping sounds, and the mechanical noise associated with purse seining.

Figure 6:
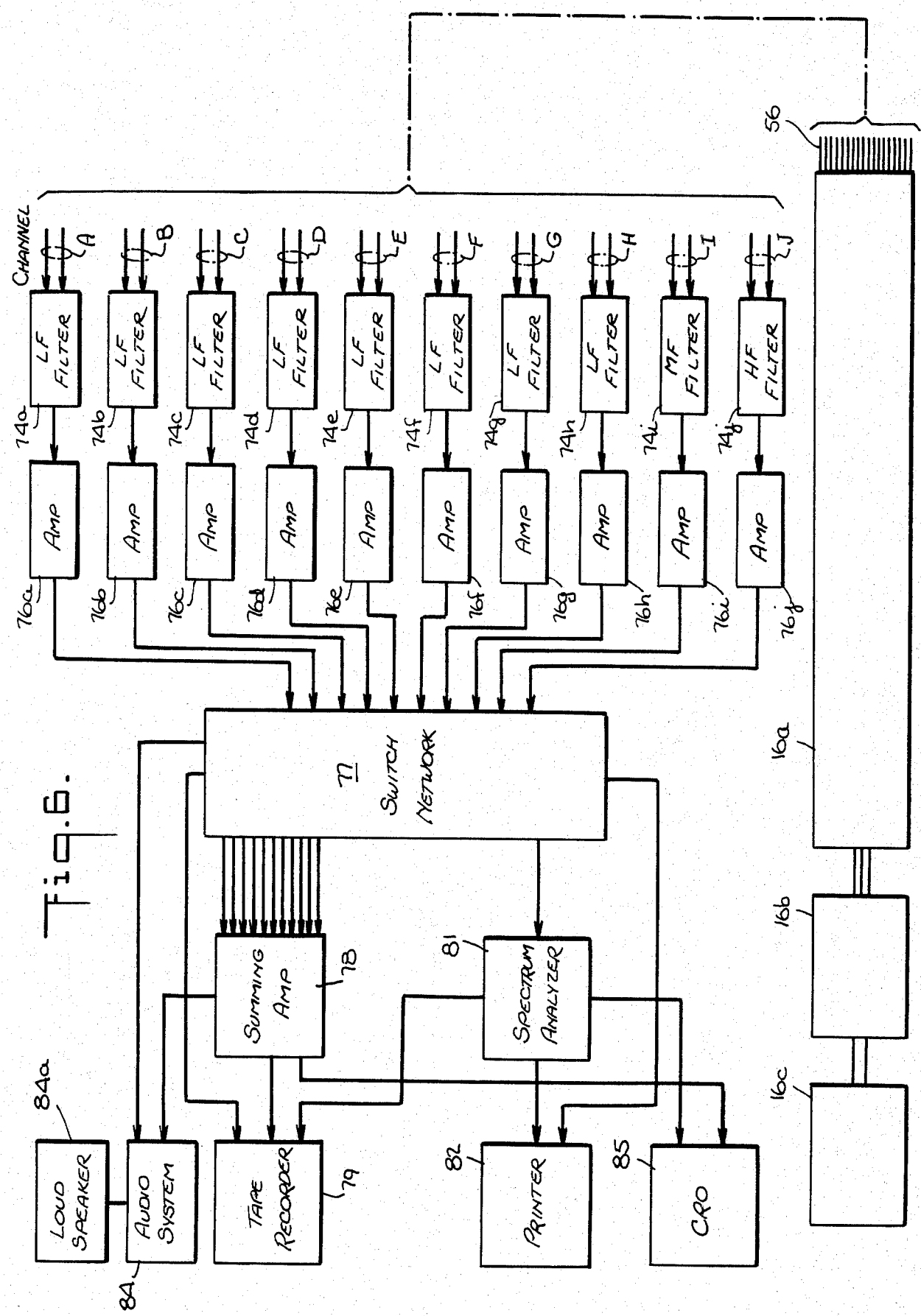
FIG. 6 represents one embodiment of pattern recognition circuits connected to an acoustic array for receiving signals from the array and for use in identifying these signals.

FIG. 6 shows a typical signal handling system for use with the acoustic array 16 in order to analyze and classify the sounds picked up by the hydrophones 38, 41 and 43. The three subarrays 16a, 16b and 16c of the acoustic array 16 are shown in block form with the lowest frequency portion 16a that includes the sections 29-36 (FIG. 2) at the right. The output of each group transformer 65a to 65j is connected as channels A-J via conductors in cables 56 and 48, respectively, to the inputs of band-pass filters 74a-7j (low pass, middle frequency pass, and high pass, respectively) to filter out undesired electrical noise. Channels H′, I′, and J′ are not shown. The filtered signals are then passed through amplifiers 76a-76j, respectively. The outputs of all of the amplifiers 76a-76j are connected to a switching network 77. By means of the switching network, the output of any amplifier may be connected to tape recorder 79. Signals from the amplifiers may be connected to tape recorder 79. Signals from the amplifiers can be selectively connected by switching network 77 to amplifier 78 in which the signals are combined and transmitted to tape recorder 79. Alternatively, the switching network 77 may deliver the amplifier signals selectively to the tape recorder 79 without passing them through the summing amplifier 78. Recorded signals can be used for subsequent analysis and classification analysis.

A typical amplifier which can be used and which includes a signal conditioning amplifier and a summing amplifier is Model RA-44X manufactured by SIE, Inc. which has ten identical channels plus one channel of summed data. Also Channels A-H can be selected individually to be summed algebraically with other selected channels. Recorded signals can be used in preparing "hard copy" reproductions for comparison to other signal outputs from the array.

Signals from the switching network 77 and the summing amplifier 78 can also be fed to audio system 84 where they can be reproduced by loudspeaker 84 or by headphones (not shown). Still another output of the switching network 77 is connected to a spectrum analyzer 81, the output of which can be connected to a printer 82 and/or to a cathode ray oscilloscope (CRO) 85 to present waveforms which can be visually inspected for identifying the character and probable origin of sounds picked up by the acoustic array 16. A further output of the switching network 77 is connected directly to the printer 82, bypassing the spectrum analyzer 81. Spectrum analyzer 81 can comprise a Unicon Realtime spectrum analyzer #4512 FFT and a Video scan unit #SC-1. Recorder 79 can comprise a Unicon continuous record unit #4633A.

FIG. 7 shows visual recordings which are typical of sounds produced by a porpoise. The output of the summing amplifier 78 when connected to oscilloscope 85 produces an oscillogram 83. When the output of summing amplifier 78 is analyzed in the spectrum analyzer 81, it produces a power spectrum 84 in the frequency from 0-10 Khz.

The output signal of the spectrum analyzer can also be used to produce displays of frequency versus time, e.g. "water-fall displays". Waterfall displays 86, 87 and 88 illustrate, respectively, the use of summed (low, mid, and high frequency subarrays 16a, 16b, and 16c) channels, mid frequency (subarray 16b), and low frequency (subarray 16a) in the detection of Delphinus (porpoise) vocalizations. Comparison of these displays show a marked absence of low frequency sound, while the other panels show that both mid frequency and high frequency subarrays are detecting buzzes and whistles which are characteristic of porpoise (Delphinus). When individual channels A-H were used, a Delphinus call was rarely received, due to the high frequency, low amplitude, characteristics of their vocalizations. In order to pick up these dolphin sounds on the low frequency hydrophones, the summing amplifier was used to maximize the signal-to-noise ratio. Thus, the spectrum analysis system provides the user with three different display outputs, oscillograms (amplitude vs. time), power spectrums (amplitude vs. frequency), and spectrograms or "waterfall" display (frequency vs. time).

It can be noted that the porpoise produces little, if any, sound in the low frequency range; however, the waveforms in the high frequency and mid-frequency ranges, together with the power spectrum and the ocillogram, identify the sound as having come from a Pacific porpoise (Delphinus) or a school of them.

Figure 8:
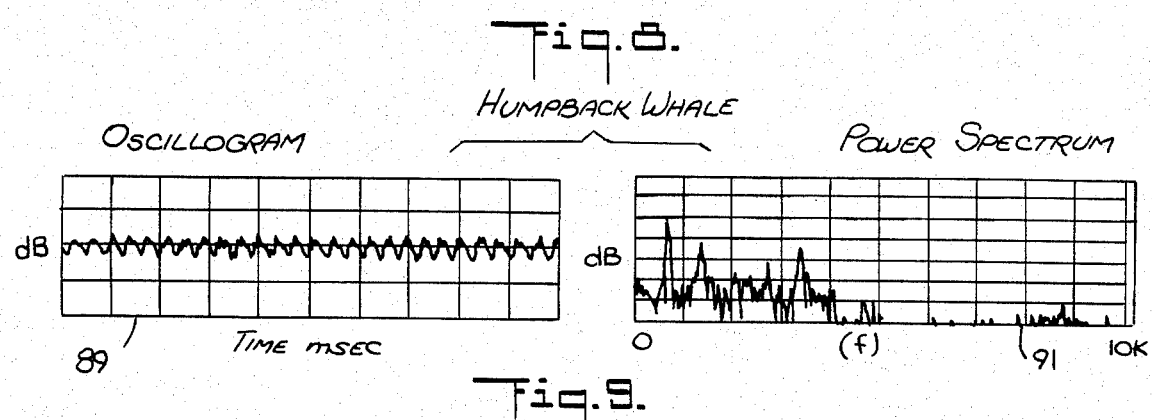
FIG. 8 represents two graphs of information derived from acoustic signals from a humpback whale.

FIG. 8 shows an oscillogram 89 and a power spectrum 91 typical of a humpback whale. It is evident that these presentations are entirely different from the corresponding presentations for a porpoise.

Figure 9:
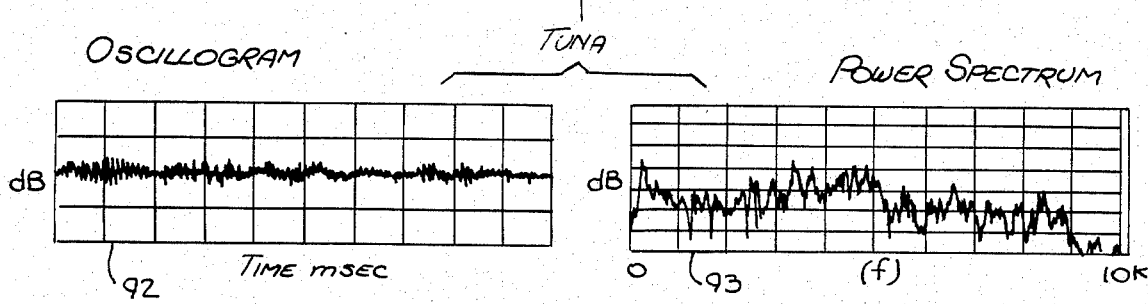
FIG. 9 is a graphical analysis of signals from schooling (tuna).

Finally, FIG. 9 shows an oscillogram 92 and a power spectrum 93 typical of a school of tuna. While it might take a highly trained operator to determine the difference between the power spectrum 91 in FIG. 8 and the power spectrum 93 in FIG. 9, the availability of the oscillograms 89 and 92 make it a simple matter to determine whether the sound is coming from a humpback whale or a school of tuna. Similarly, the presentations of the oscillogram 83, the power spectrum 84, and the "waterfall" displays 86-88 in FIG. 7 are all clearly distinct from the presentations for the other two marine animals illustrated in FIGS. 8 and 9.

During tests, the location of marine mammals was verified by first detecting their sounds, then turning the array 16 until maximum signal reception was achieved, and finally moving the array towards the sound. During one test, a maximum signal reception was bracketed to an arc of 20°. The midpoint of this arc was selected and on this course visual verification of porpoises occurred twelve minutes later.

Tests have shown that the frequency response of the embodiment of array 16 disclosed herein is good to about 10 Khz for high frequency signals less than one mile away. In several tests, by simultaneously monitoring channels A and H from the low frequency hydrophone groups 29-36, the approximate direction of a signal source could be determined by a stereo effect produced by the signals received separately on these two channels.

During testing, marine mammal sound sources were always detected by the array before they were visually detected. As the array came closer to the source, sound levels audibly presented by audio system 84 increased. The same trends were true for the reception of the noise of ships. The detection of a vessel or ship in the area of testing was typically first noted by the towed array and then visually verified.

During another test, pilot whales were sighted and faint whistle-like vocalizations were heard. These sounds increased in intensity until very distinct loud sounds were recorded for about 2 hours. Visibility during this test period was about 1 mile and no other visual observations of the animals were made during the recording period. The towing ship then made a 180° turn and thereafter about six Delphinus were sighted. These may have been the sources of the loud noises previously recorded. This recording period demonstrated the sounds of a flyby of porpoises with the signal level increasing as the porpoises approached the array, with maximum levels as the porpoises were adjacent to the array, and with diminishing signals as the animals moved towards the stern of the tow ship.

During another test, the sea state was calm and visibility excellent (10 to 12 miles). Faint vocalizations were heard. Upon continuing on the same course, the vocalization sounds were received for another 20 minutes. By turning the array 90° of the original course and then back again, it was possible to localize the quadrant of the strongest sound reception. Within this quadrant the 20° arc of courses that produced the strongest signal was noted and the midpoint of that arc selected as the searching course. Twelve minutes after selecting this course the first Delphinus was sighted. Within five minutes a large group of about one hundred dolphins was observed. The tow ship's course was turned to parallel that of the dolphins. Recordings of these dolphins were made for two hours. Thus the array can be used first to detect marine animal sounds, then to select a direction for the sound source, and lastly, to find and continually monitor the movement and interactions of the marine animals over a period of time.

Sounds from tests were analyzed using the displays produced by means of spectrum analyzer 81 as well as aurally. The analysis included displays of a signal's time versus frequency relationship in real time. Hard copies were prepared by printer 82 when permanent records were desired. The resulting analysis enabled a study to be made of the reception quality of the array during different sea states and towing conditions, the frequency response of the array, and the amplitude sensitivity of the array.

The reception distance of array 16 depends on the frequency of the sound (low frequency sounds are transmitted through the water over longer distances than high frequency sounds) and the amplitude of the sound source (vessel noise has a higher source amplitude than an individual fish or porpoise).

During tests, a variety of marine mammal sounds were analyzed and the majority of them attributed to either pilot whales (*Globicephela melaena*) or the white belly dolphin (*Delphinus delphis*). A variety of whistles, buzzes and clicks which were of Delphinus origin and a scream which as believed to be from a pilot whale were recorded. The dolphin vocalizations were received on the middle frequency channel I, the high frequency channel J and by the summing of all channels with summing amplifier 78. Individual low frequency channels A–H rarely received dolphin vocalizations. This is believed to result from the high frequency, low amplitude characteristics of these vocalizations. In order to pick up dolphin sounds on the low frequency hydrophones 38, the summing amplifier 78 was used to maximize the signal-to-noise ratio. In contrast, the pilot whale screams which are high amplitude sounds of long duration can be received on any of channels A–J. The pilot whale sounds may be so intense that they can overload the amplifiers 76a–76j. The frequency range of Delphinus vocalizations was determined to be distinctly higher than the pilot whale cells and the short whistle or click nature of these calls was easily distinguished from the long duration screams of the pilot whale.

By use of the towed array it is possible to create a catalog (both visual and audible records) of known sounds produced from verified sources. By using the catalog of visual displays of known sounds and listening to a library of recordings of these sounds, any user of the array can become skilled in identifying the source and direction of sources of marine sounds.

Useful catalog classifications for type signatures of fish, animal life, etc. can include, for example, C.W. signals, noting the initial frequency, the peak frequency, the duration, whether rising or falling, and the rate and number of squeals, etc. When pulsed signals are encountered, the frequency and the rate or the pulse interval can also be noted.

The embodiment of the invention disclosed herein was designed to be reasonably optimum for the detection of sounds produced by schools of yellowfin tuna in the northern Pacific and the sounds of porpoises and pilot whales possibly accompanying the tuna. The three different center frequencies of the subarrays 16a–16c were selected in view of the swimming sounds and the gill and jaw popping sounds emitted by tuna in the low frequency and mid-frequency ranges, respectively. The high frequency range was determined by the phonations of porpoises and pilot whales. Accordingly, where the sources of sounds of other fish, marine animals, bottom shrimp, ship sounds, etc. are to be detected, the array, including the number of groups of hydrophones for each different frequency, the spacing of hydrophones within a group, as well as the other design criteria disclosed herein, will be conditioned in accordance with the range of frequencies to be detected. Thus, instead of three subarrays of the embodiment disclosed herein, a pair of subarrays designed for two different frequencies or a plurality of subarrays greater than three for greater than three different frequencies can be employed. In addition, the number of isolation modules can be varied as determined by the nature of the array and the degree to which the array is to "stand off" from the ship. Thus additional isolation modules beyond the two disclosed in the embodiment herein can be used to attenuate motions of the array, especially when the array is to be towed at appreciable distances from the ship. Furthermore the orientation of hydrophones within the array can be varied in accordance with the direction with respect to the array of a sound source which is to be detected. Thus the hydrophones can be oriented with respect to the array to be sensitive to directions other than those in a horizontal plane as in the embodiment disclosed herein. For example, orientation in a vertical plane can be used where sound sources adjacent to the bottom are to be detected and analyzed.

It is to be understood that the invention has been described in terms of a specific embodiment and that modifications may be made therein without departing from the true scope of the invention as defined by the following claims.

What is claimed is:

1. An acoustic array system for sensing underwater marine sounds in a plurality of different bands of sound frequencies comprising:

an acoustic array adapted to be submerged including:

(a) a first portion having a first set of a plurality of hydrophones spaced longitudinally along its length, the length of the first portion being at least a substantial fraction of a first acoustic wavelength of a first band of sound frequencies, the spacing between the hydrophones in the first set being a minor fraction of the first acoustic wavelength; and (b) a second portion comprising a second set of a plurality hydrophones spaced longitudinally along its length, the length of the second portion being a fraction of the length of the first portion and being at least a substantial fraction of a second acoustic wavelength of a second band of sound frequencies which is different than the first band of sound frequencies, the spacing between the hydrophones in the second set being a minor fraction of the second acoustic wavelength; and means connected to each of the first set and second set of hydrophones for presenting representations of output signals therefrom in separate frequency bands grouped around the first and second acoustic wavelengths for use in determining the identity of the source of the marine sounds received by the hydrophones and the direction of the source of marine sounds with respect to the acoustic array.

2. An acoustic array system in accordance with claim 1 in which the acoustic array includes a closed elongated tubular housing with the first set of hydrophones and the second set of hydrophones disposed along the length of the housing, and a fluid of specific gravity less than water sealed within the housing, the quantity of fluid being selected to establish a predetermined condition of buoyancy for the acoustic array.

3. An acoustic array system in accordance with claim 1 in which the acoustic array comprises a tubular housing with the first portion and the second portion disposed along the length of the interior of the housing and in which the walls of the housing comprise means for transmitting marine sounds to the hydrophones of the sets of plural hydrophones disposed therein.

4. A method of identifying marine animals underwater by using an acoustic array to sense the sounds of the marine animals, the array having:

a first portion whose length is at least a substantial fraction of the first acoustic wavelength of a first band of sound frequencies, a first set of a plurality of hydrophones spaced along the length at intervals which are minor fraction of the first acoustic wavelength, a second portion having a length which is a fraction of the length of the first portion and is at least a substantial fraction of a second acoustic wavelength of a second band of sound frequencies which is different than the first band of sound frequencies, a second set of a plurality of hydrophones spaced along the length of the second portion at intervals which are a minor fraction of the second acoustic wavelength, and means connected to the first and second set of hydrophones for presenting representations of output signals therefrom in separate frequency bands, the method of identifying marine animals comprising the steps of:

sensing the representations of output signals;

orienting the array to determine the direction of the source of the marine sounds with respect to the acoustic array from the representations of output signals; and determining the identity of the source of the marine sounds being sensed by distinguishing the output signals in the separate frequency bands.

5. A method of identifying marine animals underwater in accordance with claim 4 in which the step of sensing the representations of output signals comprises sensing visual representations of the output signals.

6. A method in accordance with claim 4 in which the first and second sets of hydrophones of the array are disposed inside and along the length of an elongated tubular housing having walls for transmitting marine sounds to the hydrophones, and comprising the further step of:

towing the elongated tubular housing underwater along its length.

7. An acoustic system to receive and analyze underwater marine sounds, said system comprising:

an acoustic array adapted to be submerged comprising, (a) a first portion comprising a first set of longitudinally spaced apart hydrophones, the length of the first portion being at least a substantial fraction of a first acoustic wavelength, the spacing between the hydrophones being less than the first acoustic wavelength, (b) a second portion comprising a second set of longitudinally spaced apart hydrophones, the length of the second portion being less than the length of the first portion and being at least a substantial fraction of a second acoustic wavelength which is less than the first acoustic wavelength, the spacing between the hydrophones in the second set being less than the second acoustic wavelength, and (c) a third portion comprising a third set of longitudinally spaced apart hydrophones, the length of the third portion being less than the length of the second portion and being at least a substantial fraction of a third acoustic wavelength which is less than the second acoustic wavelength, and the spacing between the hydrophones in the third set being less than of the third acoustic wavelength;

amplifier and filter means connected to the three sets of hydrophones for identifying signals therefrom in separate frequency bands grouped around the first, second, and third acoustic wavelengths; and means for presenting information derived from the amplifier and filter means to determine the direction to and the nature of the source of the sounds.

8. The system as defined in claim 7 in which the amplifier and filter means comprises:

a first band pass section connected to the first set of hydrophones to respond to low frequency sounds, including sounds having the first wavelength, reaching the first set of hydrophones;

a second band pass section connected to the second set of hydrophones to respond to intermediate frequency sounds, including sounds having the second wavelength, reaching the second set of hydrophones; and a third band pass section connected to the third set of hydrophones to respond to relatively high frequency sounds, including sounds having the third wavelength, reaching the third set of hydrophones.

9. The system as defined in claim 7 in which the means for presenting information comprises an oscilloscope to display the output of at least one of the first, second and third portion of the acoustic array.

10. The system as defined in claim 7 in which the means for presenting information comprises a spectrum analyzer to display a spectral analysis of at least one of a signal and a combined signal from all of the hydrophones.

11. The system as defined in claim 7 in which the first, second, and third portions of the array are aligned end to end.

12. The system as defined in claim 7 in which:

the spacing between the hydrophones of the first group is less than one-tenth of the first acoustic wavelength, the spacing of the hydrophones in the second group is less than one-tenth of the second acoustic wavelength, and the spacing of the hydrophones in the third group is less than one-fifth of the third acoustic wavelength.

13. The system as defined in claim 7 in which:

the length of the second portion is less than one-tenth the length of the first portion, being at least a substantial fraction of the second acoustic wavelength which is less than one-tenth the first acoustic wavelength; and the length of the third portion is less than one-fourth the length of the second portion, being at least a substantial fraction of the third acoustic wavelength which is less than one-fourth the second acoustic wavelength.

14. The system as defined in claim 7 and further comprising:

a longitudinally elastic vibration isolation module having a predetermined longitudinal elasticity; and means for coupling the module to the forward end of the acoustic array for towing the acoustic array.

15. The system as defined in claim 14 in which the vibration module and the array have a predetermined bouyancy at a predetermined depth of water.

16. The system as defined in claim 9 in which the length of the first portion of the acoustic array is substantially equal to one wavelength of a predetermined lower frequency of sounds emitted by a target fish, the length of the second portion is substantially equal to one wavelength of a middle frequency of sounds emitted by the target fish; and the length of the third portion is substantially equal to one wavelength of the sounds emitted by the target fish.

17. A method for receiving and analyzing marine sounds using an acoustic array system including an array having:
(a) a first portion having a length which is at least a substantial fraction of a first acoustic wavelength, hydrophones being longitudinally spaced along the length at intervals which are less than of the first acoustic wavelength;
(b) a second portion having a length which is less than the length of the first portion and which is at least a substantial fraction of a second acoustic wavelength, hydrophones being longitudinally spaced along the length at intervals less than of the second acoustic wavelength;
(c) a third portion having a length which is less than the length of the second portion and which is at least a substantial fraction of a third acoustic wavelength, hydrophones being longitudinally spaced along the length at intervals less than the third acoustic wavelength;
amplifier and filter means adapted to be selectively connected to the three sets of hydrophones to identify signals therefrom in separate frequency bands grouped around the first, second, and third acoustic wavelengths; and
means for displaying information derived from the amplifier and filter means,
the method comprising the steps of:
towing the acoustic array through water along a controlled path at a predetermined depth below the surface;
orienting the acoustic array to receive marine sounds; and
utilizing the means to display information to determine at least one of the nature of and the direction to the source of the received marine sounds.

18. The method as defined in claim 17 in which the amplifier and filter means comprises:
a first band pass section, adapted to be connected between the first set of hydrophones and the means for displaying information, to respond to low frequency sounds reaching the first set of hydrophones, including sounds having the first wavelength,
a second band pass section, adapted to be connected between the second set of hydrophones and the means for displaying information, to respond to intermediate frequency sounds reaching the second set of hydrophones, including sounds having the second wavelength, and
a third band pass section, adapted to be connected between the third set of hydrophones and the means for displaying information, to respond to relatively high frequency sounds reaching the third set of hydrophones, inlcuding sounds having a third wavelength which comprises the further step of:
connecting at least one of the first, second or third band pass sections between the respective set of hydrophones and the means for displaying information.

19. The method as defined in claim 18 in which the means for displaying information includes an oscilloscope connected to the amplifier and filter means and further comprising the steps of:
selecting at least one of a signal received on a band pass section and a mixed signal comprising the output of at least two band pass sections for display on the oscilloscope; and
analyzing the oscilloscope display for sounds characteristic of particular fish.

20. The method as defined in claim 17 in which the means for displaying information comprises a spectrum analyzer for displaying a spectral analysis and comprising the further step of:
displaying sound from at least one portion of the array on the spectrum analyzer; and
identifying waterfall patterns which are characteristic of known fish.

21. The method as defined in claim 17, in which the first, second, and third portions of the array are aligned end to end and which comprises the further step of:
orienting the array to determine the direction from which a marine sound is coming.

22. A method for identifying a marine animal by the underwater sounds which it produces by using a passive acoustic array coupled to a receiver for simultaneously but separately detecting underwater sounds present in at least one low frequency band and one higher frequency band which is distinct from the low frequency band, the method including the steps of:
detecting sounds propagated under water in both the low freguency band and in the high frequency band by plural kinds of marine animals;
analyzing and classifying the sounds present in each frequency band according to the animal known to have produced them; and
detecting the sounds from an unknown animal in both frequency bands and comparing the sounds present in at least one of the frequency bands with the previously classified sounds of known animals to identify the unknown animal.

23. A method in accordance with claim 22 for identifying when two kinds of marine animals are present at the same location, one animal having a known dominant sound in the low frequency band and the other animal having another known dominant sound in the high frequency band which comprises:
detecting the concurrent presence of the known dominant sound in the respective frequency band.

24. A method of locating a school of tuna and determining whether it is accompanied by porpoise by using under water sound receiving apparatus which is capable of detecting sound in a low frequency band and in at least one higher frequency band which is separate from the lower frequency band, the method comprising the steps of:
locating a school of tuna by detecting sound by means of the underwater receiving apparatus using only the low frequency band; and
analyzing sound present in at least one higher frequency band, to determine whether sounds characteristic of porpoise are present.

25. The method of claim 24 in which the step of analyzing includes determining whether whistle, click, or buzz sounds are present.

26. A transducer system for use in the reception of underwater sounds including:
an array having a length substantially equal to the underwater wavelength of a sound whose frequency is at the center of a band of frequencies to be detected, the array having plural hydrophones spaced along the length, the hydrophones comprising at least two groups, each group having a beam width at a given frequency and each group having an independent output; and means for connecting the outputs of the groups together to provide the array with a beam width at the given frequency which is narrower than that of one of the groups at the given frequency.

27. A transducer system in accordance with claim 26 in which there are at least seven hydrophones spaced along the length of the array.

28. A transducer system in accordance with claim 26 and further comprising:

a second array having a length substantially equal to the underwater wavelength of a sound at the center of a second band of frequencies to be detected and having plural hydrophones spaced along the length, the underwater wavelength of the second array being different than the wavelength of the first array, and the hydrophones in the second array being connected in at least two groups, each group having a characteristic beam width at a given frequency and each group having an independent output; and means for connecting the outputs of groups in the second array together to provide the second array with a beam width which is narrower at the given frequency than that of a single group in the second array.

29. A transducer system in accordance width claim 28 in which the wavelength of the second array is m/4 times the wavelength of the first array, where m is an integer.

30. An acoustic array system for sensing underwater marine sounds in a plurality of different bands of sound frequencies comprising:

an acoustic array adapted to be submerged including:

(a) a first portion having a first set of a plurality of hydrophones spaced longitudinally along its length, the length of the first portion being at least a substantial fraction of a first acoustic wavelength of a first band of sound frequencies, the spacing between the hydrophones in the first set being a minor fraction of the first acoustic wavelength; the first set of hydrophones being divided into groups of a plurality of hydrophones;

(b) a second portion comprising a second set of plurality hydrophones spaced longitudinally along its length, the length of the second portion being a fraction of the length of the first portion and being at least a substantial fraction of a second acoustic wavelength of a second band of sound frequencies which is different than the first band of sound frequencies, the spacing between the hydrophones in the second set being a minor fraction of the second acoustic wavelength; and (c) means connected to each of the first set and second set of hydrophones for presenting representations of output signals therefrom in separate frequency bands grouped around the first and second acoustic wavelengths for use in determining the identity of the source of the marine sounds received by the hydrophones and the direction of the source of marine sounds with respect to the acoustic array; the means connected to each of the first set and the second set of hydrophones for presenting representations of output signals therefrom including means selectively connected to each of the groups of the first set of hydrophones for enabling different combinations of the plurality of groups of hydrophones to be obtained, the width of the beam of sensitivity of the combination of the hydrophones being an inverse function of the number of groups of hydrophones in the combination of the hydrophones.

31. An acoustic array system in accordance with claim 30 in which portions of the hydrophones in each group are connected in parallel.

32. An acoustic array system in accordance with claim 30 in which the plurality of hydrophones in a group in at least one of the sets of hydrophones is divided into at least two portions each having an output circuit and in which the means selectively connected to each of the first set and the second set for presenting representations of the signals therefrom are connected to the output circuits.

33. An acoustic array system in accordance with claim 32 in which each of the output circuits presents the output of one half of the plurality of hydrophones in a group, the output circuits enabling the output signal of the complete or of one half of the complete group to be presented.

34. An acoustic array system in accordance with claim 30 in which the first set of hydrophones is divided into at least four groups of hydrophones, the means selectively connected to each of the groups of the first set of hydrophones for enabling different combinations of the plurality of the groups of hydrophones to be obtained being adapted to be connected to any combination of groups to modify the effective length of the first portion of the array and thereby the beam width of the first portion of the array for a given frequency.

35. A method for identifying marine animals underwater by using an acoustic array to sense the sounds of the marine animals, the array having:

a first portion whose length is at least a substantial fraction of the first acoustic wavelength of a first band of sound frequencies, a first set of a plurality of hyrdophomes spaced along the length at intervals which are minor fraction of the first acoustic wavelength, the first set of hydrophones being divided into a plurality of groups, a second portion having a length which is a fraction of the length of the first portion and is at least a substantial fraction of a second acoustic wavelength of a second band of sound frequencies which is different than the first band of sound frequencies, a second set of a plurality of hydrophones spaced along the length of the second portion at intervals which are a minor fraction of the second acoustic wavelength, and means connected to the first and second set of hyrdophones for presenting representation of output signals therefrom in separate frequency bands, the means for presenting representations of output signals therefrom including means for selectively connecting the groups of the first set of hydrophones to obtain different combinations having different beam widths of sensitivity, the method of identifying marine animals comprising the steps of:

sensing the representations of output signals;

orienting the array to determine the direction of the source of the marine sounds with respect to the acoustic array from the representations of output signals;

determining the identity of the source of the marine sounds being sensed by distinguishing the output signals in the separate frequency bands; and selecting groups of hydrophones to provide a combination of groups having optimum directional sensitivity at a wavelength corresponding to that of the predominant sound produced by a particular kind of marine animal.

36. A method in accordance with claim 35 in which the hydrophones in each group are connected in parallel and in which the step of selecting groups of hydrophones comprises selecting groups of hydrophones connected in parallel.

37. A method in accordance with claim 35 in which the plurality of hydrophones in a group in at least one of the sets of hydrophones is divided into at least two portions and outputs of the hydrophones in each portion are connected to different ones of at least two output circuits and each output circuit presenting the output of a fraction of the hydrophones of the group as an output signal and comprising the further step of:

selecting the output of both output circuits or of one output circuit for presentation.

38. A method in accordance with claim 35 in which the hydrophones in a group in at least one of the sets of hydrophones are divided and connected to different ones of at least two output circuits, each output circuit including approximately half the hydrophones of the group and each output circuit presenting the output of that fraction of the hydrophones of the group as an output signal and comprising the further step of:

selecting the output of both output circuits or of one output circuit for presentation.

* * * * *

UNITED STATES PATENT AND TRADEMARK OFFICE
CERTIFICATE OF CORRECTION

PATENT NO. : 4,509,151
DATED : April 2, 1985
INVENTOR(S) : George B. Anderson

It is certified that error appears in the above-identified patent and that said Letters Patent is hereby corrected as shown below:

Column 8, line 13, insert "," after "64"

Columns 9-10, chart, after "HF SUBARRAY", insert --16c--

Column 10, line 38, delete "7j" and insert --74j--

Signed and Sealed this

Tenth Day of September 1985

[SEAL]

Attest:

DONALD J. QUIGG

Attesting Officer     Acting Commissioner of Patents and Trademarks - Designate